Patented Mar. 4, 1924.

1,485,698

UNITED STATES PATENT OFFICE.

CHARLES E. NORTH, OF MONTCLAIR, NEW JERSEY, ASSIGNOR TO THE MILK OIL CORPORATION, A CORPORATION OF DELAWARE.

PROCESS OF OBTAINING MILK FAT.

No Drawing. Application filed July 6, 1922. Serial No. 573,230.

*To all whom it may concern:*

Be it known that I, CHARLES E. NORTH, a citizen of the United States, residing at Montclair, in the county of Essex and State of New Jersey, have invented a certain new and useful Process for Obtaining Milk Fat, of which the following is a specification.

The invention upon which this application for Letters Patent of the United States is based resides in a new and useful process of obtaining oil from milk. Processes for accomplishing similar results are numerous and well known, but it has heretofore been extremely difficult to obtain this oil in a perfectly pure anhydrous condition without substantial loss of valuable products, unless by means which are highly uneconomical and which are incompatible with commercial requirements.

It will be understood, especially by those skilled in this art, that variations of method, the introduction of new steps and the uses of materials which contribute to the economy of the ultimate result, if only, apparently, to a very slight degree, are of vital importance owing to the scale on which the process, if practiced commercially, must be carried out. This fact is controlling in the present instance.

In order that my improvements may be fully understood and appreciated, I shall give a detailed explanation of the conditions encountered in carrying out the process, the objects I have had in view in my attempts to meet them, and the means that I have adopted for solving the problems which they present.

Ordinary market milk is composed of, approximately, 88% water, 8½% solids, not fat, and 3½% fat. The non-fat solids contain about 3½% casein and albumen in colloidal suspension, while the remaining 5% consists of sugar and salts in solution. The problem, therefore, is to recover the 3½% pure fat, the correct solution involving the separation and recovery of this component from the other solid and liquid ingredients.

Primarily, the fat differes in its characteristics from the other ingredients by its lightness, having a lower specific gravity than any of them, and this obviously suggests the possibility of its more or less complete segregation by centrifugal force. The fat emulsion in milk is in a physical condition in which the oil or fat is in a finely divided state, held in suspension in the milk fluid. The particles of fat are not of uniform but of widely different dimensions, so that on the application of centrifugal force the larger particles respond much more rapidly to the pull of such force than the smaller. The force which resists separation, under such circumstances, is the viscosity of the liquid in which they are suspended, and this viscosity may act so effectively as to entirely prevent the separation of the smaller fat particles from the milk serum, because they present so large a surface in proportion to their mass that their friction with the viscous milk serum cannot be overcome by the pull of the centrifuge. The reduction in the viscosity of the milk fluid, as for example, by dilution with water, may, therefore, be a vital factor in facilitating the separation of the fat particles from the milk by centrifugal force.

The removal of water, casein and other non-fat solids is obviously accomplished to a marked extent by passing the whole milk through a centrifugal cream separator. For example, 10 cans of whole milk with a fat percentage of 3½ may be passed through an ordinary cream separator and produce one can of cream with a fat percentage of 35, and a skim milk percentage of 65, the separation producing also 9 cans of skim milk in which the fat percentage is practically negligible, the component elements being water and non-fat solids. While, however, a large proportion of the water and casein have been removed the separation of these elements is not complete. To be more exact, if we start with 100 lbs. of whole milk containing 88 lbs. water, 8¼ lbs. non-fat solids and 3¼ lbs. of fat, the cream resulting from such separation would contain only 4.8 lbs. of water, .446 lbs. of non-fat solids and 3½ lbs. of fat.

The casein in milk and cream is more difficult to remove from the fat than any of the milk ingredients, perhaps for the reason held by some authorities, that it forms an envelope or jacket around each fat globule. Hence in the process of recovering oil from milk the removal of this casein constitutes the chief obstacle. In sweet milk and cream the casein in a semi-solid or colloidal state may be washed out by dilution with water, and recognizing this fact I dilute the cream produced, as above stated, by centrifugal action with water sufficient to restore the mixture to its original volume. If 10 cans of whole milk produce one can of cream and this is diluted with 9 cans of water, the result would be 10 cans of cream in which the skim milk has been diluted 9 times. This dilution I then pass through a cream separator with the result that I produce one can of washed cream containing, theoretically, only $\frac{1}{10}$ the quantity of casein which it had before the washing.

I repeat this process effecting a second washing, and produce cream having $\frac{9}{10}$ of the remaining casein removed, or only 1% of the casein of unwashed cream. The separation of the fat by centrifugal force from the water used in diluting the cream is much easier than the separation of the fat from the original milk, because the water has much less viscosity than the milk serum in its original state. As a consequence, while a minute percentage of fat may be found in the skim milk obtained from the original separation, yet examinations made of the dilution water thrown out by the first and second washings show an almost entire absence of fat by any ordinary methods of testing.

The washed cream produced by the steps above enumerated may contain approximately 40% fat and 60% water in which there remains but 1% of the original casein of the unwashed cream. To obtain the fat as a pure oil requires further treatment for the removal of this water and casein. The minute particles of fat because of their small size constitute an obstacle to any attempt to directly separate the oil from the mixture by the use of a centrifuge such as is known in the art as an "oil separator" or "de-hydrator" and it is necessary that these small particles of fat should be coalesced and combined with larger particles, and this I effect by the process commonly known as "whipping."

Up to the point where this latter step is resorted to the temperature of the milk and the cream dilutions must conform to those commercially used in the ordinary centrifugal separation of cream which is about 100° F. As a preliminary step to the so-called "whipping" it is necessary to reduce the temperature of the washed cream to that suitable for whipping, which experience has shown to be about 55° F. and this I accomplish by running the washed cream over or through a cooler which reduces its temperature to this point.

The whipping is accomplished by any well known method or means heretofore in use for this purpose. For example, an ordinary ice cream freezer may be used for the purpose in which the agitator or paddle is geared up from 200 revolutions per minute which is about the speed used in making ice cream, to about 700 revolutions per minute or more, and at such speed the cream is whipped in from 45 seconds to 2 minutes to a consistency which brings about a complete coalescence of the small into the large particles of fat. This coalescence is manifestly accompanied by the separation of the fat particles from the fluid which envelops and surrounds them.

Up to this point the process as I have set it forth may, for the purposes of this case, be regarded as part of the prior art, as I have not only practiced it, but described it in patents and applications. But considering this whipped cream, in which there has been a concentration of fat by reason of the whipping, it is manifest that it is in a condition to permit the ready separation and removal of the water and the other constituents from the oil. I have heretofore effected this separation by heating the whipped cream in a tank sufficiently to convert the fat into a fluid oil and then permitting the oil to rise to the surface while the water and other constituents descend into a layer of fluid under the supernatant fat. This process, however, involved the use of tanks of considerable size and a period of time to permit sedimentation, or separation of the fat and water into distinct layers.

I have, however, discovered a fact which I believe to have been heretofore wholly unknown, and the utilization of which has had a most exceptional effect upon the process with which we are now dealing. I have found, in other words, that if the whipped cream be heated to melt the fat and then subjected to the well known process heretofore ordinarily used for separating out the fat from such liquids as whey in cheese factories or butter milk in butter factories; in other words, simply run through the centrifugal apparatus known as a "whey separator" and which operates on liquids in which there are considerable percentages of water that the steps subsequently followed in the recovery of the oil are very greatly and surprisingly facilitated.

In practice, the whipped cream after melting, may be conveniently diluted with from 1 to 4 times its volume of warm water before it is passed through the whey separator. The object in adding water at this point is to wash out such slight percentage of casein as may still adhere to the fat particles and this I have found it does. The product delivered from the whey separator is a thick yellowish liquid having the appearance of a cloudy oil, containing about 95 per cent fat, 5 per cent of dilution water and a very minute percentage of casein. This product closely resembles that of the supernatant layer when the melted whipped cream and water is allowed to stand in sedimentation tanks.

This product I then pass through the centrifugal machine known as an oil separator or dehydrator. This is a well known device designed for cleaning and dehydrating concentrated oils in which the proportion of other ingredients is very small as compared to that of the oil. I have found, for example, in practice, that by means of such a device I may obtain from the cloudy oil of the sedimentation tanks clear oil at the rate of 150 pounds per hour; whereas, if the whipped cream has been concentrated by passage through a whey separator, and the product passed through an oil separator, the capacity of the same separator is increased to 900 pounds per hour. This means that by the use of the whey separator in the above described or any similar process, the capacity of the oil separator is increased six times.

If after the clear oil is thus obtained from the oil separator there should remain any sensible amount of moisture in the product, this may be removed in the usual way, as by evaporation in an ordinary vacuum pan used for condensing milk which operates under a partial vacuum at low temperature.

In the above I have set forth in detail the complete process as I prefer to carry it out. This process it will be observed involves the following steps: (a) Separation of cream from milk by centrifugal action; (b) washing the separated cream with water and passing the diluted cream again through a centrifugal separator; (c) repeating this washing and separating step; (d) whipping or agitating the washed cream; (e) washing and concentrating the heated whipped cream by passing it through a whey separator; (f) extracting or dehydrating this product by passing it through an oil separator; (g) drying the product, when necessary, in a vacuum pan evaporator.

In this process care must be taken to maintain the material at the proper temperatures, and these I have given in part. In dehydrating the temperature should be about 120° F. The temperature must never be too high, and any temperature above 130° F. I have found to result in an undesirable flavor of the product.

In the above description, I have used the term "whey separator" to define that particular form of apparatus which is used, but this apparatus may be more definitely defined a centrifuge which is capable of separating out a concentrated fat from the other ingredients of the mixture. Whey separators, in other words, may be of varying character and pass under different names, but to meet the conditions essential to this invention, they must, however constructed, be capable of this action.

What I therefore claim is:—

1. The process of recovering oil from milk which consists in treating the milk or cream separated therefrom so as to produce a mixture of concentrated fat, water and a small percentage of casein or non-fat solids, subjecting this product to the action of a whey separator, and then passing the resulting product through an oil separator to obtain a pure clear oil.

2. In the process of recovering oil from milk, the step herein described of diluting with a relatively large volume of water a concentrated and melted mixture of the fat, water and a small percentage of casein or non-fat solids, and then passing the product through a centrifuge constructed or adapted to operate as a fat concentrator to separate out from such a mixture all of the fat containing a very small percentage of water.

3. In the process of recovering oil from milk the step herein described of diluting with water a concentrated and melted mixture of the fat, water and a small percentage of casein or non-fat solids, and then passing the product through a whey separator.

4. The process herein described of recovering oil from milk, consisting in the following steps carried out under the prescribed conditions of temperature; separating centrifugally the cream from whole milk, diluting one or more times the separated cream and separating it from the dilution water, whipping the washed and separated cream, heating and diluting the whipped cream and passing it through a whey separator, dehydrating or passing the product through an oil separator, and evaporating out the moisture, if any, from the clear oil.

5. In the process of recovering oil from milk the steps hereinbefore set forth of whipping or agitating a washed cream, diluting the same with water at a temperature sufficiently high to melt the fat in the whipped cream, passing the mixture through a whey separator and finally recovering the oil in a clear state by passing the product of the whey separator through an oil separator.

CHARLES E. NORTH.